Figure 1:
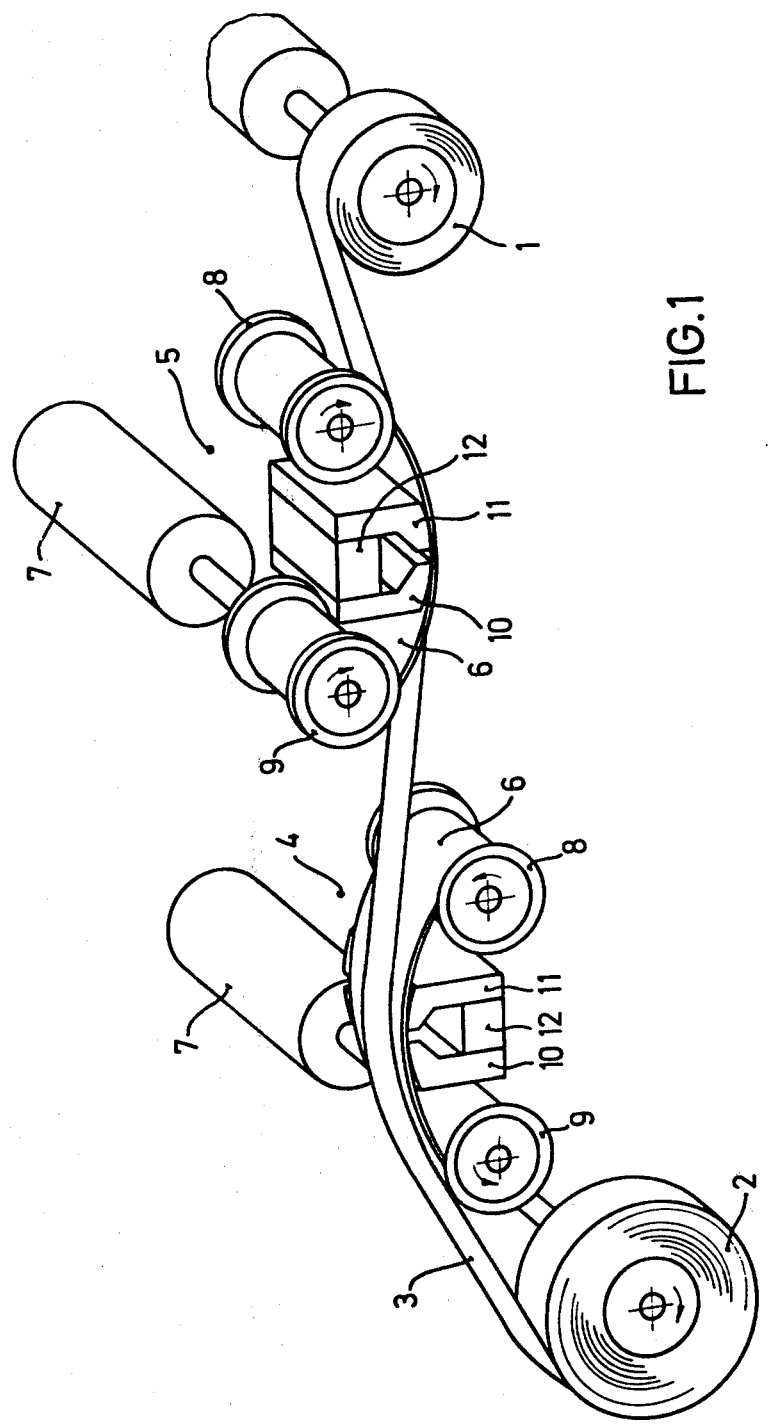

United States Patent [19]

Schoettle et al.

[11] 4,213,222
[45] Jul. 22, 1980

[54] CLEANING APPARATUS FOR A WEB OF PLASTICS FILM HAVING A MAGNETIC COATING

[75] Inventors: Klaus Schoettle, Heidelberg; Peter Dobler, Ludwigshafen; Helmut Lewin, Bobenheim-Roxheim; Eberhard Koester, Frankenthal, all of Fed. Rep. of Germany

[73] Assignee: BASF Aktiengesellschaft, Fed. Rep. of Germany

[21] Appl. No.: 973,799

[22] Filed: Dec. 28, 1978

[30] Foreign Application Priority Data

Jan. 19, 1978 [DE] Fed. Rep. of Germany ... 7801442[U]

[51] Int. Cl.² ............................................ B08B 11/00
[52] U.S. Cl. ....................................................... 15/100
[58] Field of Search .................................... 15/1.5, 100

[56] References Cited

U.S. PATENT DOCUMENTS

| 3,641,605 | 2/1972 | Lindsay | 15/100 |
| 3,945,079 | 3/1976 | Westberg | 15/100 |
| 4,010,514 | 3/1977 | Fischer et al. | 15/100 X |

FOREIGN PATENT DOCUMENTS

2025513 12/1970 Fed. Rep. of Germany ............. 15/1.5

*Primary Examiner*—Edward L. Roberts
*Attorney, Agent, or Firm*—Keil & Witherspoon

[57] ABSTRACT

An apparatus for continuously cleaning the surface of a web of plastics film provided with a magnetic coating, especially the surface of a magnetic tape, the surface to be cleaned being continuously kept in close contact with a tape of nonwoven fabric by virtue of the configuration of the path of travel of the web, wherein the poles of a magnet, which define an air gap, are located in the region of the contact area, behind the tape of nonwoven fabric, on the side facing away from the web.

3 Claims, 2 Drawing Figures

CLEANING APPARATUS FOR A WEB OF PLASTICS FILM HAVING A MAGNETIC COATING

The present invention relates to an apparatus for continously cleaning the surface of a web of plastics film provided with one or more magnetic coatings, especially the surface of a magnetic tape, in which the surface to be cleaned is kept in close contact with a tape of nonwoven fabric by virtue of the configuration of the path of travel of the web.

U.S. Pat. No. 4,010,514 discloses the cleaning of a film web by passing it over a ribbon of nonwoven material and intensifying the cleaning action by means of a suction roller over which the said ribbon passes. To achieve close contact between the film web and the ribbon of nonwoven material, the former is pressed against the latter by using an appropriate path of web travel, so that it is the web tension and the angle of wrap of the web over the ribbon of nonwoven material guided in an arc-shaped path, which determine the cleaning action.

In the case of very thin film webs or tapes there is a risk that the suction required to achieve the desired effect may lead to deformation, e.g. stretching and embossing, of the web or or tape at the orifices of the suction roller. For the same reason, the web tension and the angle of wrap cannot be large. Hence, satisfactory results have not been achieved with conventional cleaning apparatus in the case of very thin webs or tapes. A further disadvantage is that the pneumatic suction device is an expensive unit.

It is an object of the present invention to provide a cleaning apparatus by means of which even very thin film webs or tapes provided with magnetic coatings can be cleaned effectively and at the same time gently, the apparatus being of very simple design.

We have found that this object is achieved if the poles of a magnet, which define an air gap, are located in the region of the contact area, behind the tape of nonwoven fabric, on the side facing away from the web of coated plastics film.

It may be advantageous to pass the web which is to be cleaned at an angle over the tape of nonwoven fabric.

The magnetic force exerted on the web of coated base material or tape is slight, but sufficient to draw magnetizable dust particles, relatively loosely attached to the web surface, into the tape of nonwoven fabric. It is particularly advantageous that this additional force is uniformly distributed over the entire width of the web or tape. As a result, locally concentrated pressure on the web is avoided and the surface is cleaned uniformly. Furthermore, the attractive force of the magnet prevent the dust particles on the surface of the tape of nonwoven fabric from being picked up again by the web which is to be cleaned. Experiments have shown that a high proportion of the non-magnetic dust particles are also removed from the surface, together with the magnetic particles, as a result of some type of binding force between the two types of particles.

Figure 2:
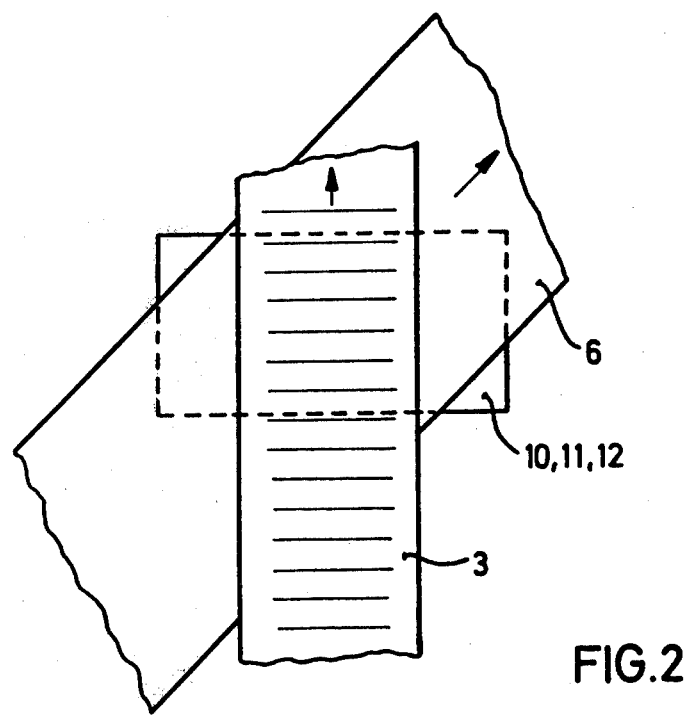

The apparatus according to the invention is described in more detail below, with reference to the accompanying drawings, in which FIG. 1 is a schematic overall view of the cleaning apparatus of the invention, and FIG. 2 shows a preferred arrangement of a magnetic tape relative to the tape of nonwoven fabric.

FIG. 1 shows the apparatus for cleaning the front and back of a magnetic tape. If webs of coated base material are to be cleaned, only the size of the components changes.

Between a take-up roll 1, and a supply roll 2, both of which can be driven, the magnetic tape 3 travels so that its front and its back respectively pass over separate cleaning units 4 and 5. The tape of nonwoven fabric 6 consists of commercial textile fibers, preferably nylon fibers, and during the cleaning operation is wound, so that it travels in the opposite direction to the magnetic tape 3 which is to be cleaned, from a supply reel 8 onto a take-up reel 9 by means of an electric drive 7. Between the reels 8 and 9, the tape of nonwoven fabric 6 passes in an arc over the poles 10 and 11 of a magnet 12. The magnet may be a permanent magnet (for example consisting of ferrite, samarium or cobalt) or an electromagnet. Soft magnetic materials (for example low-carbon steel) are preferred for the poles 10, 11.

The air gap between the poles is from 0.5 to 10 mm, preferably from 1.0 to 5 mm. As a result, the lines of magnetic force penetrate the magnetic tape 3, which in this region is in close contact with the tape of nonwoven fabric 6.

The take-up roll 1 and supply roll 2, and the two cleaning units 4 and 5 are arranged relative to one another in such a way that the magnetic tape 3 travels in an arc over the two tapes of nonwoven fabric. In the case of very thin magnetic tapes ($<10$ μm) the angle of wrap should not exceed 30°, a tape tension of $<100$ p per cm tape width being assumed. The pressure with which the magnetic tape 3 bears against the tape of nonwoven fabric can be adjusted by varying the angle of wrap via the magnet assembly 10, 11, 12 which can be displaced, and fixed, on a rail (not shown in the drawing) which runs at right angles to the tape of nonwoven fabric.

Use of the entire surface of the tape of nonwoven fabric can be achieved if the magnetic tape to be cleaned, and the tape of nonwoven fabric are not parallel to one another but at an angle of from 10° to 80°, preferably from 30° to 60°, thus giving the path of travel of the magnetic tape 3 shown in FIG. 2. Instead of the tape of nonwoven fabric, other conventional cleaning tapes, for example linen or cotton tapes, may be used.

We claim:

1. An apparatus for continuously cleaning the surface of a web of plastics film provided with a magnetic coating, especially the surface of a magnetic tape, the surface to be cleaned being kept in close contact with a tape of nonwoven fabric by virtue of the configuration of the path of travel of the web, wherein the poles of a magnet, which define an air gap, are located in the region of the contact area, behind the tape of nonwoven fabric, on the side facing away from the web of coated plastics film.

2. An apparatus as claimed in claim 1, wherein the magnet is located between the take-up reel and supply reel of the tape of nonwoven fabric.

3. An apparatus as claimed in claim 1 or 2, wherein the web to be cleaned travels at an angle over the tape of nonwoven fabric.

* * * * *